United States Patent Office 3,428,998
Patented Feb. 25, 1969

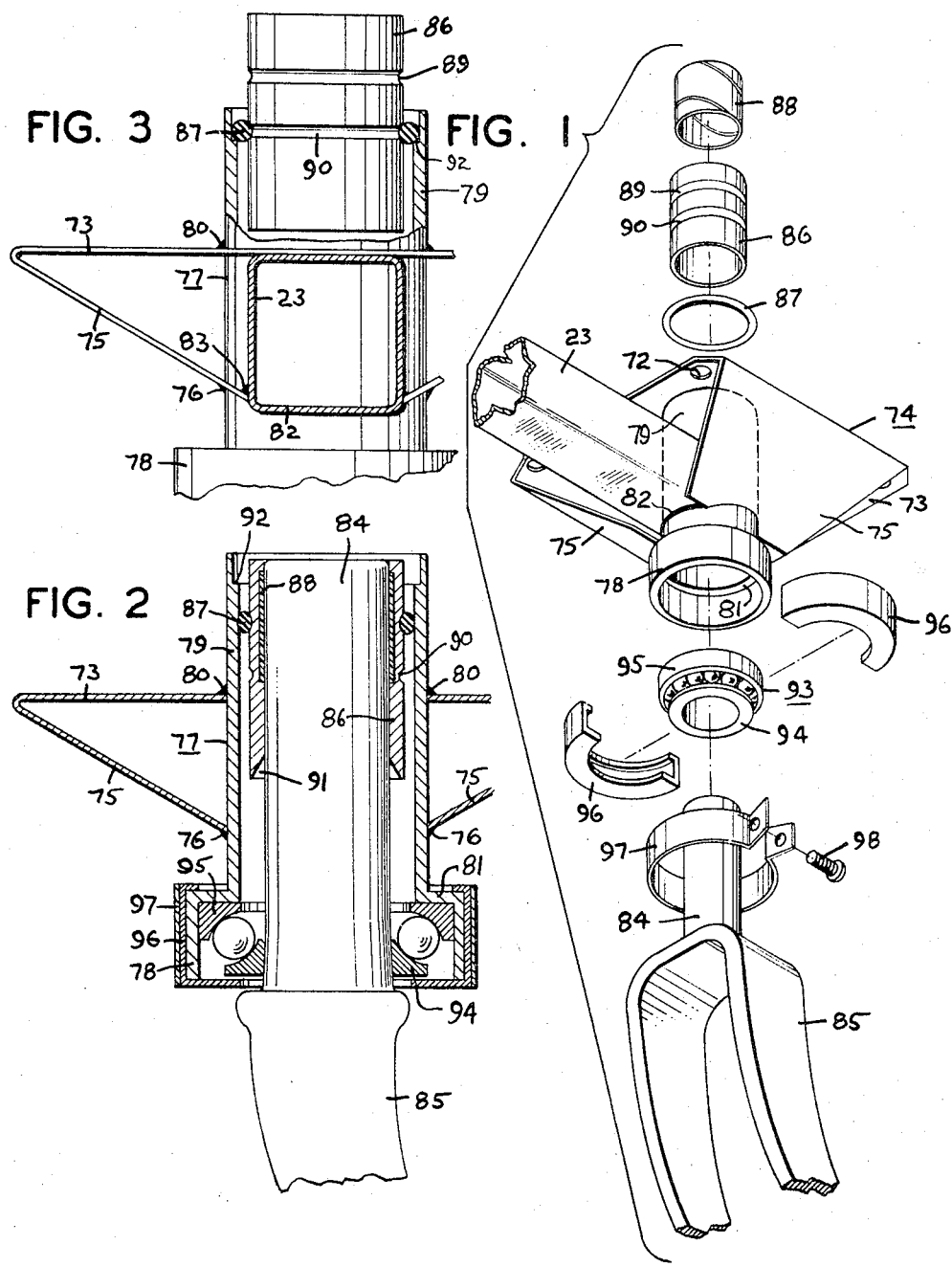

3,428,998
SWIVEL BEARING STRUCTURE
Aaron S. Craven, Jr., 505 Independence Ave.,
Philadelphia, Pa. 19126
Original application Feb. 4, 1965, Ser. No. 430,387.
Divided and this application Aug. 12, 1966, Ser.
No. 572,063
U.S. Cl. 16—21    5 Claims
Int. Cl. B60b 33/00; F16d 63/00; F16c 19/50

This invention relates generally to wheel bearings. More particularly, this invention relates to a novel wheel bearing structure which enables the vehicle supported thereby to traverse uneven terrain or flooring surfaces with a great degree of stability and preventing the setting up of undue destructive stresses in the vehicle structure, this application being a division of my copending application Ser. No. 430,387, now Patent No. 3,287,026, filed Feb. 4, 1965, entitled, "Flexible Bed Wheeled Vehicle."

Rolling vehicles such as wagons and dollies are normally constructed with supporting wheel structures which include no resilient elements other than possibly rubber tires. Consequently, lateral shock impulses caused by broken or stepped surfaces over which the vehicle travels are transmitted through the wheels to the support bearings and to the vehicle and its load. Such shock impulses can obviously be destructive, both to the load being carried and to the bearings. Accordingly, it is the object of this invention to provide a novel wheel bearing structure, for use on wheeled vehicles, which is effective to absorb the major portion of shocks induced laterally or transversely into the bearing by transmission from the associated wheel or caster.

Another object of this invention is to provide a novel bearing structure as aforesaid which includes a lower radial and thrust ball bearing for vertical support, and a resiliently floated upper sleeve bearing.

The foregoing and other objects of my invention will become clear from reading the following specification in conjunction with examination of the appended drawing, wherein:

FIGURE 1 is an exploded view of the novel bearing assembly according to the invention illustrating the elements of the anti-shock upper sleeve bearing and the radial and thrust ball bearing;

FIGURE 2 illustrates a vertical sectional view through the bearing structure in assembled condition; and FIGURE 3 shows the anti-shock upper sleeve portion of the bearing structure in partly assembled condition.

In the several figures, like elements are denoted by like reference characters.

Referring now to the drawing it is observed that the bearing assembly is securable to the understructure of a vehicle to be supported by bolts or screws projected through the corner apertures 72 in the base plate portion 73 of the semi-pyramidal sheet metal mounting base 74. Turned back at an angle from a pair of opposite side edges of the base plate 73 are rigidifying and reinforcing legs 75 welded as at 76 at their lower ends to a part of the outer periphery of hollow cylindrical bearing housing 77. Cylindrical bearing housing 77 is formed from two hollow cylindrical coaxially end aligned portions of different diameter, the lower portion 78 being of larger diameter but of shorter axial extent than the portion 79 extending upward therefrom through the base plate 73 to a point of termination thereabove, the upper portion 79 being fixedly secured to the base plate by the peripherally extending weld 80. The upper end of the cylindrical upper portion 79 is open as is the bottom end of lower cylindrical portion 78, these upper and lower bearing housing portions being fixedly interconnected by radially extending annular wall 81 therebetween. As is best seen in FIGURES 1 and 3, the end of a support beam 23 may be rigidly secured to the cylindrical bearing housing 77 by a weld 82 and to the base legs 75 of the mounting base 74 by welds 83.

The cylindrical sleeve bearing housing 77 contains two separate bearings which engage respectively the upper and lower end regions of vertically extending caster swivel shaft 84, the lower end of which is rigidly affixed to the bridge of the caster fork 85. The upper bearing housed by the cylindrical upper portion 79 of bearing housing 77 is a floating sleeve bearing which permits free rotation therewithin of the caster shaft 84 together with a certain amount of resilient lateral movement, while the lower bearing is a combination radial and thrust ball bearing which supports the vertical load and also withstands lateral impact.

The upper sleeve bearing includes three parts, a hollow cylindrical sleeve 86, an elastomer O-ring 87 and a helically cut low friction bearing sleeve 88. The cylindrical sleeve 86 is provided wtih a pair of axially spaced peripherally extending circular grooves 89 and 90, a conical peripherally extending inside taper 91 at its lower end, and a peripherally extending inside cylindrical recess in its upper region within which is fitted the low friction bearing sleeve 88, this latter feature being best seen in the showing of FIGURE 2. As also best seen in FIGURE 2 the recess within which the low friction bearing sleeve 88 is disposed does not extend upward completely to the top of cylindrical sleeve 86 so that the bearing sleeve 88 is restrained against axial movement within the cylindrical sleeve 86 so that axial motion of the caster swivel shaft 84 cannot eventually eject the bearing sleeve 88 from its position within the cylindrical sleeve 86. The helical cut in the bearing sleeve 88 allows the sleeve diameter to be reduced so that it may be projected downward into the bearing sleeve 86 and then allowed to resiliently expand into its conforming recess, nylon being a suitable bearing material.

The sleeve bearing is assembled into the bearing housing by first rolling the elastomer O-ring 87 over the outer surface of cylindrical sleeve 86 until the O-ring drops into lower groove 90, and then projecting the assembled O-ring 87 and sleeve 86 downward into the open end of cylindrical upper portion 79 of the bearing housing 77 until the O-ring seats upon a peripherally extending internal shoulder 92, as best seen in FIGURE 3. From FIGURE 3 it is observed that the outer diameter of O-ring 87 is larger than that of the internal diameter of the cylindrical upper portion 79 below the shoulder 92. Consequently, when the upper end of cylindrical sleeve 86 is pressed axially downward, O-ring 87 is placed in radial compression and rolls upward out of groove 90 and toward groove 89 while being simultaneously carried downward inside the cylindrical bearing housing below the shoulder 92. The downward movement of cylindrical sleeve 86 is continued until O-ring 87 drops into upper groove 89, at which point the physical relationship shown in FIGURE 2 exists. This is a mechanically stable position for the sleeve 86 and it will be appreciated that the sleeve may move within limits radially within the bearing housing, and may also rotate laterially within limits about a horizontal axis through the O-ring.

The combination radial and thrust ball bearing 93 is projected downward onto the shaft 84 with the lower or inner race 94 being press fitted onto the shaft at the lower end thereof. The shaft 84 with ball bearing affixed thereto is now projected upward from the bottom into the bearing housing 77 so that the upper end of the shaft 84 is led into and upward through the upper sleeve bearing by the conical taper 91 at the lower end thereof until the upper race 95 of ball bearing 93 seats against the annular wall 81 which joins the housing upper section 79 to the lower section 78, the diameter of the upper race 95 being such as to fit closely within the inside diameter of housing bottom portion 78 to thereby prevent undue lateral play.

The assembly is retained against vertical separation by a pair of semicircular locking clamping pieces 96 of generally C-shape in vertical cross section, the clamping pieces being close fittingly disposed peripherally around the cylindrical bottom portion 78 with the upper arm of each clamping piece overlying the housing wall 81 and the lower arm of each clamping piece underlying the undersurface of ball bearing lower race 94 in spaced relation therebelow. The locking clamping pieces 96 are retained in position by a clamping band 97 disposed peripherally thereabout and pulled up tight by means of a machine screw 89.

As is best seen in FIGURE 2, the ball retaining faces of the ball bearing races have a slightly larger radius of curvature than that of the ball bearings so that a certain amount of pivoting between the races is possible. This feature combined with the floating and resilient shiftability of the upper sleeve bearing provides a shock absorbing action to the bearing structure when a caster is subjected to impulses having horizontal components.

Having now described my invention in connection with a particularly illustrated embodiment thereof, it will be appreciated that variations and modifications of my invention may now naturally occur from time to time to those persons normally skilled in the art without departing from the essential scope or spirit of the invention.

What is claimed as new and useful is:

1. A caster swivel bearing comprising in combination, a bearing housing and a wheel fork having a cylindrical shaft fixed thereto and extending vertically axially rotatably through an upper sleeve bearing and a lower combination radial and thrust bearing disposed within the bearing housing, said upper sleeve bearing being suspended within said bearing housing by resilient elastomer means extending between said sleeve bearing and said bearing housing, whereby said sleeve bearing is resiliently radially shiftable within said bearing housing in response to forces exerted radially through said fork shaft due to horizontal force components exerted on the fork by the carried wheel to thereby act as a shock absorber.

2. The swivel bearing as defined in claim 1 wherein said sleeve bearing comprises a main cylindrical support sleeve interiorly circumferentially lined with a fork shaft engaging low friction facing and having a circular annular groove extending completely circumferentially about the exterior thereof, the inside surface of said bearing housing in the region in which said sleeve bearing is suspended being cylindrical and of larger diameter than the outside diameter of said sleeve bearing support sleeve, said support sleeve being suspended coaxially within the surrounding bearing housing portion by the aforesaid elastomer means, and said elastomer means being a resilient ring seated in said sleeve bearing exterior annular groove and compressed between said groove surface and the radially outwardly disposed inside cylindrical surface of said bearing housing.

3. The wheel bearing as defined in claim 1 wherein said resilient elastomer means is disposed between said sleeve bearing and the inside wall surface of said bearing housing radially outward of said wheel fork cylindrical shaft.

4. The swivel bearing as defined in claim 2 wherein said lower combination radial and thrust bearing is a ball bearing having upper and lower races, the upper race being seated against an overlying rigid wall forming part of said bearing housing and to which the thrust load is transmitted, and said lower race being fixed on and disposed about the lower end of said fork shaft.

5. The swivel bearing as defined in claim 3 wherein said sleeve bearing comprises a main cylindrical support sleeve interiorly circumferentially lined with a fork shaft engaging low friction facing and having a circular annular groove extending completely circumferentially about the exterior thereof, the inside surface of said bearing housing in the region in which said sleeve bearing is suspended being cylindrical and of larger diameter than the outside diameter of said sleeve bearing support sleeve, said support sleeve being suspended coaxially within the surrounding bearing housing portion by the aforesaid elastomer means, and said elastomer means being a resilient ring seated in said sleeve bearing exterior annular groove and compressed between said groove surface and the radially outwardly disposed inside cylindrical surface of said bearing housing.

References Cited

UNITED STATES PATENTS 2,914,340  11/1959  Black _____ 16—21
3,127,633   4/1964  Schultz _____ 16—21

BOBBY R. GAY, *Primary Examiner.*

D. L. TROUTMAN, *Assistant Examiner.*

U.S. Cl. X.R.

188—1; 308—35